United States Patent Office 2,792,444
Patented May 14, 1957

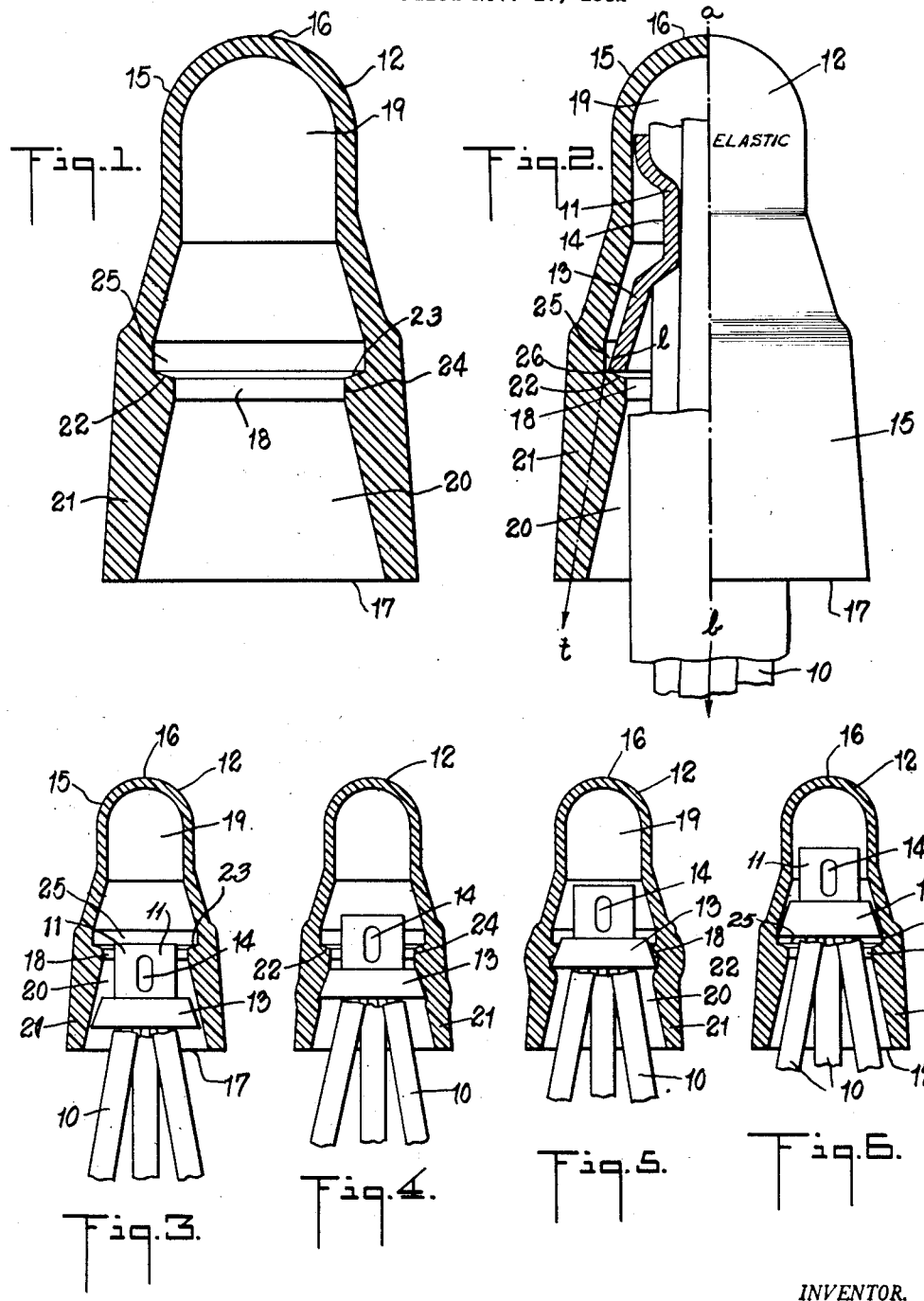

2,792,444

PIGTAIL CONNECTOR

Martin D. Bergan, Westfield, N. J., assignor to The Thomas & Betts Co., Elizabeth, N. J., a corporation of New Jersey Application November 17, 1952, Serial No. 321,011

2 Claims. (Cl. 174—87)

The invention relates in general to a shielded pigtail connector of the type wherein the ends of electric conductors are grouped together to form a splice, the splice secured within the bore of a metal sleeve functioning as a connector and the preformed unit so formed replaceably contained within a shielding cap or other form of guard formed of an insulating material. The invention specifically relates to certain improvements in the cap or guard when formed of a rubber-like, resilient, plastic material.

It is known in the art to provide such caps internally with an integral flange projecting into the bore from the wall of the cap operative as a barrier in a tendency to resist the accidental escape of the connector from the cap. As previously constructed these retaining flanges had to be made sufficiently flexible to hinge freely about their outer perimeter in order to bend inwardly to permit the connector which was sometimes rigid to pass through an opening in the flange as the connector was forced therethrough into its intended position adjacent the closed end of the cap.

However, and largely by reason of the frailty of the flange to resist loads thereon by reason of an outward movement of the connector and unless extreme care is exercised in maintaining the assembly of pigtail splice, connector and insulating cap as intended, the connector is apt to lose its cap and thus become exposed for accidental short-circuiting of the associated electrical system. In the prior art devices this escape of the connector from the cap is due to abnormal pulls on the conductors forming the splice bending the internal flange towards the open end of the cap sufficiently to permit the connectors to escape through the hole enlarged thereby in the center of the flange. Attempts to avoid this possibility by strengthening the flange did not prove satisfactory in actual practice because there was always present the possibility that if the displacing load on the connector were sufficient the flange could be bent to permit the escape of the connector, and this is particularly true in those cases where the load on the connector squeezed the portion of the cap lying between the flange and the open end of the cap, with the resulting bellying outwardly of this portion of the wall of the cap.

The problem was further complicated by the requirement that the side wall of the cap must be radially distendable momentarily to permit the insertion of the connector into place past the barrier flange and sufficiently elastic to recover its shape after the connector is in place.

Accordingly, the primary object of the invention is to provide a simplified form of guarded pigtail connector which when fabricated will remain intact and resistant to loads tending to dismantle it accidentally, while permitting intentional forceful separation of the connector from its guarding shield.

Broadly, this objective is attained in so far as the cap is concerned by forming its open end portion as a rugged strain-absorbing column whose inner end is provided with a solidly-backed shoulder in distinction from a bendable flange for receiving the connector, and which inner end in its region of greatest cross-section of material and thus greatest rigidity is provided with a constricted throat which can be distended radially to permit the passage of the connector therethrough as it seeks its seat on the rugged and non-bendable shouldered end of the column, but which resists distortion in an axial direction and thus resists accidental separation of the connector from its shielding cap.

In so far as the rigid metal connector is concerned, the disclosure features at one end a cylindrical end portion crimped conventionally onto the conductors forming the pigtail, and at its other end an outwardly-flared skirt operative as the connector is forced through a conical bore in the column and through the constricted throat to distend the column radially and progressively until the connector is received in an annular channel provided therefor facing the shoulder, after which the column snaps back into its connector-locking position.

Various other objects and advantages of the invention will be in part obvious from an inspection of the accompanying drawings and in part will be more fully set forth in the following particular description of one form of pigtail connector embodying the invention, and the invention also consists in certain new and novel features of construction and combination of parts hereinafter set forth and claimed.

In the accompanying drawings:

Fig. 1 is a view in axial section of an insulating cap for pigtail connectors forming a preferred embodiment of the cap element of the invention;

Fig. 2 is a view partly in elevation and partly in axial section of an assembly of the cap of Fig. 1 with a pigtail connector in place in the cap and forming a preferred embodiment of the complete invention; and Figs. 3–6, inclusive, are explanatory views of the assembly of Fig. 2, showing the relation of connector and cap at successive stages of inserting the connector through the open end of the cap and past the shouldered end of its column herein featured.

In the drawings there is disclosed a plurality of insulated conductors 10 having bare ends assembled in parallel or twisted relation to form a splice. The splice is permanently secured in a connector 11 in turn housed within an insulating cap 12 particularly forming the subject-matter of this disclosure. The connector 11 is a thin-walled, sheet metal, cap-like stamping and for the most part is of cylindrical form. The connector is preferably formed of sheet copper. The lower open end of the connector is flared outwardly to form an annular rim 13 forming a flat base fashioned for continuously engaging its seat as hereinafter described. The bare ends of the conductors are secured within the connector by crimping as evidenced by the indentation 14 in the cylindrical side of the connector, and in this respect the splice and its connector resemble conventional forms of similar devices.

The cap 12 is molded from a rubber-like material having some elasticity and in the device illustrated is molded from a vinylite thermoplastic material having plastic memory and having sufficient elasticity to revert automatically to its molded form when freed from deforming loads thereon. The cap is substantially of cylindrical form with an outlining annular wall 15 with a closed end 16 and its opposite annular base-forming end 17 is wide open. The diameter of the bore of the cap is reduced about its mid-length to form a constricted throat 18 and operates to divide the interior of the cap into an upper chamber 19 dimensioned for receiving the upper portion of the connector 11 with a freely sliding fit therein and to form a lower chamber 20 of greater diameter than the upper chamber and through which extends the insulated parts of the conductors.

It is noted that the axial dimension of the cylindrical wall 24 outlining the throat 18 is of some material depth to give an element of rigidity thereto in its office of providing for resistance to its displacement in its axial direction.

The lower chamber 20 is of frusto-conical form with its larger end wide open at the base end 17 and its smaller end opening without obstruction directly into the throat 18. The lower portion of the wall 15 outlining the chamber 20 and the throat 18 forms a rugged annular strain-receiving column 21 symmetrical relative to the axis $a$—$b$ of the assembly, of maximum cross section of material and thus of greatest structural strength in the inner end thereof outlining the throat 18. The column gradually and progressively decreases in radial cross section of material from the wall outlining the throat towards its open base-forming end 17. In this way the greatest mass of available cushioning plastic material at the inner end of the column is located at the point where the pressure from the connector is received by the cap shown in Fig. 2.

The inner face of the wall 15 just above the column 21 at the inner end of the throat 18 is sharply in-cut to provide a shoulder 22 providing an annular load-receiving flat face 23 facing the closed end 16 and exposed to the upper chamber 19. It is a feature of this disclosure that column 21 is a wide-based truss capable of receiving loads at its upper shouldered end at 22 and transmitting the same through the solid bulk of the column to the base 17 without noticeable deformation. In this way there is no possibility of any transverse bending of the annular wall 24 outlining the throat while it is possible to distend the throat radially to permit the passage therethrough of the connector.

In the form of shoulder illustrated the face 23 is inclined from its outer edge inwardly and downwardly towards the throat 18 at an angle of about 10 degrees to the plane of the throat for a purpose hereinafter described.

The lower part of the upper chamber 19 has a diameter slightly larger than that of the upper part to form an annular channel 25 just above the shoulder 22 and dimensioned to receive the lower edge 26 of rim 13 of the connector when seated as indicated in Fig. 2 adjacent the outer perimeter of the face 23. The funnel-shaped, rigid metal rim 13 is dimensioned and externally angled to function as an internal round wedge capable as the connector is advanced axially through the lower chamber 20 to function as a dilator for progressively and gradually expanding the internal diameter of the column 21, through the succeeding stages from the initial position shown in Fig. 3, through the position shown in Fig. 4, then dilating the throat as shown in Fig. 5 until the dilating rim escapes into the channel 25 as shown in Fig. 6.

As only a limited portion of the wall is engaged by the dilator at any one instant of time, it follows as indicated in Figs. 4 and 5 that only a small portion of the column 21 is distended at one time and this facilitates the easy passage of the connector and minimizes the resistance of the cap to the passage therethrough of the connector. It is particularly noted that even when the connector is passing through the throat as shown in Fig. 5 the material outlining the same is not bent even though it is distended in the plane of the throat to permit the rim 13 to pass upwardly therethrough. The material of the column outlining the throat is thus not strained but, on the contrary, the working of the material incidental to its distention and recovery tends to strengthen the material of the column, particularly in the region outlining the throat, and this adds to the strength and rigidity of the shouldered part at 22 in its function of resisting the retreat of the connector backward out of the cap.

Due to the resiliency of the column 21 the parts not being dilated for the moment revert to their original configuration so that as shown in Fig. 6 the cap 12 is in its initial molded form as shown in Fig. 1. A slight pull outwards on the conductors 10 when the parts are in the Fig. 6 position will bring the rim 13 into its normal seated engagement with the bearing face 23 of the shoulder 22 as shown in Fig. 2.

Above the column 21 the balance of the wall 15, including its closed end 16, is of relatively small cross section of material as the upper portion of the cap is not intended to transmit loads therethrough, but simply functions as a shield for protecting the connector.

It can be assumed that under normal operative conditions, that is, without squeeze load on the column 21, the instant device functions as do known forms of pigtail splicers when capped by a shield of insulating material.

For the purpose of showing the cap operative in its novel aspects, it will be assumed that the base 17 is engaging some obstacle and that an outwardly directed load, as indicated by the arrow and along the axis $a$—$b$ in Fig. 2, is imposed on the bundle of conductors 10. This will have the effect of causing the outer edge 26 to bear on the face 23 close to the junction of the shoulder 23 with the balance of the wall 15 and approximately mid-width of the top of the column 21. The mean line of thrust of any outwardly directed load thus originating in the connector will be centered in a cone leading to the base 17, as indicated by the dot-and-dash line $l$—$t$ on Fig. 2, and thus through the solid interior of the column 21. This action tends to reduce slightly the diameter of the throat and thus further operates to defeat any possibility of the connector escaping through the throat.

There is apparently some slight reduction in the axial dimension of the column 21 under load. The fact that the part of the wall 15 so slightly deformed under axial load is a column means that it possesses such resistance to axial deformation as characterizes load-supporting structural columns in distinction from the internal flanged cantilever types of the similar devices in the prior art. The cap considered as a whole recovers and returns to its configuration as molded as soon as the deforming forces are removed so that normally there are no strains on the cap.

As the lower edge 26 tends to bite into the plastic face 23 more and more of the lower edge 26 contacts with the inwardly-inclined face with a tendency to form momentarily a shallow groove in the face at its juncture with the wall 15. This forms an interlock between the edge 26 and the top of the column 21 which tends to resist any possibility of the lower edge of the connector to contract in an effort to pass through the throat and, on the contrary, the pull of the conductors tends to spread the edge 26 outwardly and thus towards a frictional engagement with the wall outlining the channel 25.

It is a particular feature of novelty in this disclosure that the material forming the strain-transmitting column 21 is massed solidly beneath the shoulder 22 and in this way any tendency of the shoulder to give under load from the connector is resisted by the entire length dimension of the column. Having in view the intent to make the cap of the least possible amount of material, the length of the skirt forming column 21 is merely sufficient to protect the insulating jacket of the conductors. In the particular form of the invention illustrated the maximum cross section of material of the column at the level of the shoulder is quite thick, say, approximately one-third of the axial length of the column, and gradually reduces from said maximum cross section to its minimum cross-section at the base-forming end 17.

In this way there has been avoided the possibility in the known types of such connectors to escape from their shields by bending the internal flanges or by the collapsing of the connectors sufficiently to permit them to be drawn accidentally through the hole in the flanges.

I claim:

1. In an insulated pigtail connector assembly, the combination of a splicing sleeve having a frusto-conical end portion and a cylindrical end portion, said cylindrical portion having an outer diameter smaller than the smallest outer diameter of the frusto-conical portion of said sleeve and adapted to be crimped on a bare end portion of a plurality of bunched wire conductors, and a hollow bell-shaped cap of insulating plastic material having a pair of frusto-conical, axially aligned cavities therein, the largest diameter of the innermost cavity being connected to the smallest diameter of the outermost cavity to provide a stepped shoulder between said cavities intermediate the ends of said cap, the largest diameter of each of said cavities being at least equal to the largest diameter of the frusto-conical portion of said sleeve, and the smallest diameter of each of said cavities being substantially equal to the smallest diameter of the frusto-conical portion of said sleeve, whereby when said cap is forced down on said sleeve the frusto-conical portion of the sleeve dilates the wall of said cap progressively permitting it to be forced through the opening defined by the smallest diameter of said outermost cavity and to snap into seating position on said stepped shoulder in non-detachable relation, said stepped shoulder being inclined toward the open end of said cap at an acute angle to the axial center thereof.

2. The invention according to claim 1, characterized further in that said innermost cavity converges toward the closed end of said cap at an angle corresponding substantially to that of the frusto-conical portion of said sleeve to permit entry thereof into said cavity substantially beyond said shoulder.

References Cited in the file of this patent

UNITED STATES PATENTS

| | | |
|---|---|---|
| 2,526,277 | Rogoff | Oct. 17, 1950 |
| 2,534,881 | Schroeder | Dec. 19, 1950 |
| 2,560,683 | Buchanan | July 17, 1951 |
| 2,589,368 | Braham | Mar. 18, 1952 |
| 2,701,273 | Badeau | Feb. 1, 1955 |